April 23, 1946.   H. JANSON   2,399,121
REPRODUCTION OF A FACE
Filed Jan. 6, 1945
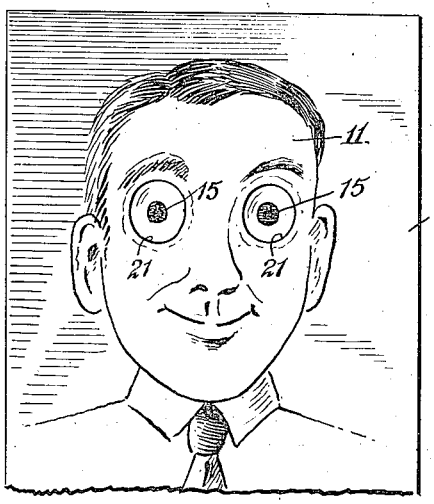
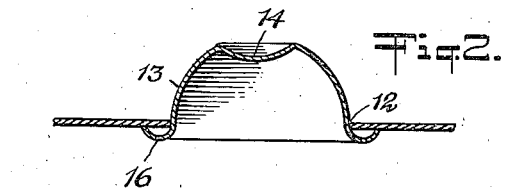
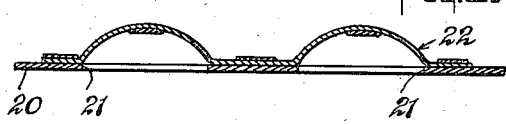
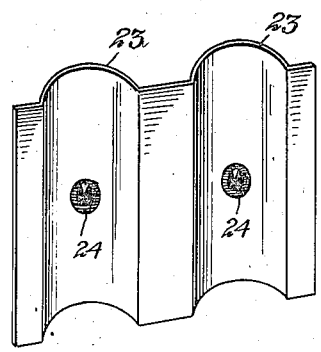
INVENTOR.
Harry Janson
BY
Munn, Liddy & Glaccum
Attorneys Patented Apr. 23, 1946

2,399,121

UNITED STATES PATENT OFFICE 2,399,121

REPRODUCTION OF A FACE

Harry Janson, Bronxville, N. Y., assignor to Douglas Leigh, Inc., New York, N. Y.

Application January 6, 1945, Serial No. 571,616

3 Claims. (Cl. 46—165)

This invention relates to advertising devices including posters, wall pictures, and other articles of manufacture, and more particularly to an optical illusion created thereon and the structure creating said illusion.

Movable and moving eyes in advertising representations of a human face have been the subject of innumerable inventions and patents. In all cases known to the present inventor, however, a relatively complicated mechanism or relatively expensive structure is required to provide the movement of the eyes or to provide the conditions necessary to permit of such movement under the stimulus of external forces, such as a series of vibrations set up in the advertising poster by passing vehicular traffic.

In the light of these prior inventions, the principal object of the present invention is the provision of an article of manufacture for entertainment or advertising use, which embodies the representation of a human face or the face of an animal, and immovable eyes set therein which, by reason of an optical illusion, appear to move in their sockets and follow a person who moves relatively thereto.

Another object is the provision of an advertising poster carrying a representation of a face in which are provided eyes which actually do not move but which apparently do move, as viewed by a passerby.

These and other objects are attained by providing relatively deep eye sockets in a representation of a face and eyes set in said eye sockets a sufficient distance back of the forward edges thereof to create the optical illusion mentioned.

It is immaterial whether the eye sockets are set behind the face or partly behind and partly in front of the face or entirely in front of the face. The essential feature which must be present in all cases, however, is a substantial space differential between the eyes or the pupils thereof and the forward limits of the sockets.

Preferred embodiments of the invention are shown in the accompanying drawing in which—

Fig. 1 is a fragmentary front view of an advertising poster on which appears a representation of a face embodying the eye construction forming the subject matter of the present invention;

Fig. 2 is a sectional view of said eye construction;

Fig. 3 is a sectional view of an alternate form of eye construction herein claimed; and Fig. 4 is a perspective view of the eyes supporting member shown in Fig. 3.

Referring now to Figs. 1 and 2, the first embodiment of the invention comprises a poster 10, a representation of a face 11 on said poster, apertures 12 in said poster where the eyes should be, eye sockets or cups 13 set into said apertures, and raised portions 14 in the floors of said cups, said raised portions comprising the eyes and bearing a representation 15 of the pupil and iris thereof. It will be seen that eye sockets or cups 13 are provided with peripheral beads or flanges 16 which facilitate affixing thereof to the poster by means of an adhesive or in any other conventional manner. Although the beads are shown affixed to the front or visible side of the poster, they need not necessarily be so affixed but may instead be fastened to the back or unseen side of the poster. When the beads are affixed to the front of the poster, they may be enlarged to any desirable degree and representations of the eyebrows, and upper and lower eyelids and lashes, may be incorporated thereon to provide a more realistic appearance. Although the apertures 12, the sockets 13 and the peripheral beads 16 are shown substantially circular in front elevational view, they may be shaped to elliptical or substantially elliptical outline to more nearly correspond to the shape of the human eye. Although a representation of the face of a man is shown in the drawing, the eye construction herein described may be applied to the representation of a woman's face or a child's face or the face of an animal, such as a dog or a horse.

The second embodiment of the invention, as shown in Figs. 3 and 4, comprises a poster 20, a representation of a face thereon which is not shown, apertures 21 where the eyes of said face should be, and eye supporting members 22 affixed to the back of the poster by means of adhesives or in any other conventional way. Said eye supporting members 22 comprise a unitary sheet of material such as paper or cardboard pressed or otherwise shaped to form a pair of valleys 23 which are spaced the same distance apart as are apertures 21. The width of said valleys is substantially equal to the diameter of the apertures. Representations 24 of eyes or eye pupils are applied to the concave surface of said valleys in registration with said apertures. Although raised portions on said valleys corresponding to the raised portions 14 of eye sockets 13 in the embodiment first above described are not shown, they may be impressed in said valleys to form more realistically appearing eyes, if this be desired.

In all of the cases above mentioned and described, the eyes are set a predetermined distance behind the forward edges or limits of the eye sockets, said distance being sufficient to create the optical illusion of a person moving relatively thereto that the eyes move in their sockets and that moving, they follow him.

It is evident that the embodiments above described are but preferred embodiments of the invention and that many modifications and variations may be incorporated therein without departing from the basic principles of the invention.

I claim:

1. An advertising poster, a representation of a face on said poster, holes in said poster where the eyes should be, an eye support affixed to the back of said poster, being spaced therefrom opposite the holes, and eyes on said support in registration with said holes, whereby the optical illusion of movement of said eyes relative to the holes is created in respect to a person moving past said poster.

2. An advertising poster, a representation of a face on said poster, holes in said poster where the eyes should be, an eye support affixed to the back of said poster, being spaced therefrom opposite the holes, and eyes on said support in registration with said holes, whereby the optical illusion of movement of said eyes relative to the holes is created in respect to a person moving past said poster, said eye support comprising a flat sheet having a pair of depressions formed therein in registration with said holes, the eyes being carried by said depressions.

3. An advertising poster, a representation of a face on said poster, holes in said poster where the eyes should be, an eye support at each of said holes therein extending backwardly of the poster, each of said eye supports comprising a cup shaped member affixed at its open end to the poster at the edges thereof surrounding the holes therein, said eye support being provided with a representation of an eye on the inner wall thereof opposite its open end, whereby the optical illusion of movement of said eye relative to the hole in the poster is created in respect to a person moving past said poster.

HARRY JANSON.